United States Patent [19]

Barba et al.

[11] 4,018,872

[45] Apr. 19, 1977

[54] PROCESS FOR THE PRODUCTION OF CONCENTRATED NITRIC ACID

[75] Inventors: Diego Barba; Fabrizio Battistoni; Candido D'Agostini; Giorgio Macchi, all of Rome, Italy

[73] Assignee: Societa' Italiana Resine S.I.R. S.p.A., Milan, Italy

[22] Filed: Dec. 9, 1975

[21] Appl. No.: 639,192

[30] Foreign Application Priority Data

Dec. 20, 1974 Italy .................................. 30824/74

[52] U.S. Cl. ................................ 423/394; 423/392
[51] Int. Cl.$^2$ ........................................ C01B 21/40
[58] Field of Search .................. 423/392, 393, 394; 203/13

[56] References Cited

UNITED STATES PATENTS 3,876,752  4/1975  Wendel .............................. 423/292

FOREIGN PATENTS OR APPLICATIONS 1,926,435  12/1969  Germany
45-15450   3/1970   Japan
910,131    11/1962  United Kingdom

*Primary Examiner*—G. O. Peters
*Attorney, Agent, or Firm*—Brumbaugh, Graves, Donohue & Raymond

[57] ABSTRACT

Nitric acid having a concentration of at least 98 wt.% is produced from nitrogen peroxide by absorbing the latter in superazeotropic nitric acid, distilling the resulting solution so as to recover nitric acid at a concentration of at least 98 wt.% and nitrogen peroxide, liquefying the latter and reacting it in a first stage with aqueous nitric acid (70–80% wt.%) and air and delivering the resulting superazeotropic nitric acid, together with the solution, to the distillation column. Nitrogen peroxide and oxygen unreacted in the first stage are contacted with nitric acid at 68–75 wt.% in a second stage, thus to produce said aqueous nitric acid fed to the second stage. The said nitric acid at 68–75 wt.% and the superazeotropic acid used for the absorption are extracted from the bottom part of the distillation column.

9 Claims, 1 Drawing Figure

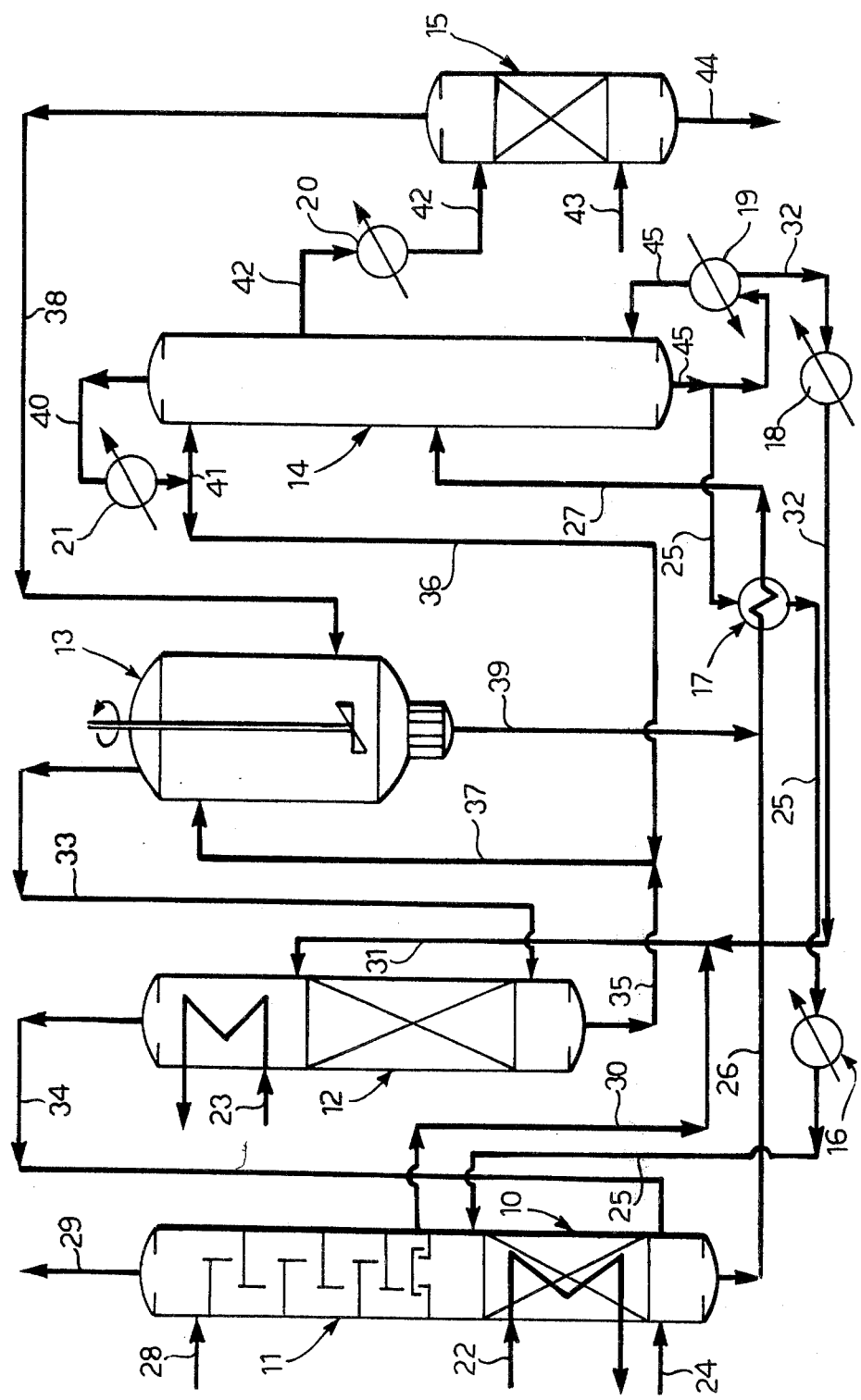

PROCESS FOR THE PRODUCTION OF CONCENTRATED NITRIC ACID

The present invention concerns an improved process for the preparation of nitric acid having a concentration of at least 98% by weight.

According to what is known in the art, it is possible to produce nitric acid with a high concentration (98% or more), by the action of a dehydrating agent on the aqueous solutions of nitric acid having an acid content of the order of 50-65% by weight.

The use of dehydrating agents, such as, for instance, sulfuric acid and magnesium nitrate, is consequential to the fact that the water-nitric acid mixtures present an azeotrope whose acid content is equal to about 69% by weight.

Furthermore the aqueous solutions with a content of nitric acid in the order of 56-65% by weight are produced by conventional processes wherein ammonia is catalytically oxidized with oxygen or gases containing oxygen, followed by an absorption of the nitrogen oxides in water or in diluted nitric acid.

More particularly, according to said processes, the dehydrating agent is mixed with the aqueous solution of nitric acid and the resulting mixture is distilled to produce hyghly concentrated nitric acid. Since the dehydrating agent selectively absorbs the water, or combines with it, it is possible by heating to develop nitric acid vapors of a very high concentration. The residual aqueous solution is then recovered and separately distilled so as to eliminate the water and thus regenerate the dehydrating agent.

This procedure involves an alternated dilution and concentration of the dehydrating agent and the concentration operation requires a great expenditure of energy. Moreover, equipments of remarkable size and expense are required, because they must be built with corrosion resistant materials.

For these reasons the production of nitric acid of high concentration has been set up, in the technique, starting from the gaseous flow originated from the catalytical oxidation of ammonia by the so called direct process.

More particularly, according to such a process, first a catalytic oxidation is carried out by air at atmospheric- or above atmospheric pressure according to the following equation:

$$4 NH_3 + 5 O_2 \rightarrow 4 NO + 6 H_2O$$

A gaseous flow with about 10% by volume of nitrogen oxide and about 17% by volume of water vapor is thus obtained, which is submitted to treatments capable of separating, at least in part, the water contained therein and to transform the nitrogen oxide into the corresponding peroxide.

For this purpose the gaseous flow is usually cooled until the water condenses and separates in the form of diluted nitric acid solution, because besides the condensation, formation of nitric acid occurs according to the equation:

$$3 NO_2 + H_2O \rightleftharpoons 2 HNO_3 + NO$$

Furthermore the transformation of the nitrogen oxide into the corresponding peroxide occurs by means of the excess oxygen present in the mixture, according to the equation:

$$2 NO + O_2 \rightarrow 2 NO_2$$

The nitrogen peroxxide, actually, is an equilibrium mixture of $NO_2$ and $N_2O_4$, which in the present specification will be simply indicated as peroxide.

At the end of such treatments, a gaseous mixture, rich in peroxide and without, or substantially without, water and nitrogen oxide is obtained and said mixture is brought into contact with concentrated nitric acid for the purpose of physically absorbing the nitrogen peroxide contained therein. The solution is then heated, thus developing gaseous peroxide and finally the cooling of this last and its liquefaction is performed.

The liquid peroxide thus obtained is reacted in autoclave with oxygen and water (or with diluted nitric acid) according to the equation:

$$2 N_2O_4 + 2 H_2O + O_2 \rightleftharpoons 4 HNO_3$$

It is possible to obtain highly concentrated nitric acid (98% or more) in periods of time industrially useful, by the use of oxygen and the application of high pressures, generally above 50 atmospheres.

However, it is preferred to perform the chemical absorption of the peroxide until an acid having a concentration in the order of 80-90% by weight is produced an then to submit said acid to distillation. In this case it is possible to utilize air as oxidizing gas, according to the equation:

$$2 N_2O_4 + 2 H_2O + O_2 + 4 N_2 \rightleftharpoons 4 HNO_3 + 4 N_2$$

and to operate at pressures lower than 10 atmospheres.

The preparation of concentrated nitric acid by the direct process presents first of all the drawbacks related to the complexity of the operations and of the equipments required for the recovery of the peroxide from the gaseous flow where it is contained and for the separation of the peroxide in a liquid form, as required for the chemical absorption stage.

Other drawbacks of the known processes are encountered in the distillation of the acid coming from the chemical absorption stage and in the recovery of the excess peroxide which does not react in said absorption stage.

The acid coming from the absorption contains, in fact, some unreacted peroxide which must be separated and recycled.

For this purpose the acid may be submitted to stripping with air before the distillation.

According to another known technique the products coming from the chemical absorption stage are submitted to distillation in a first column with separation of acid at the bottom and of peroxide at the top. The bottom product is then fractioned in a second column in order to separate the concentrated acid (98% or more) at the top and azeotropic acid at the bottom.

This manner of operating presents drawbacks related to the complexity of the required equipments and to the magnitude of the consumption.

Furthermore in the distillation column wherein the azeotropic acid is separated, undesirable corrosion phenomena occur.

According to the present invention nitric acid having a concentration of at least 98% by weight is produced without the aid of dehydrating agents, by a simple and economical process which eliminates the drawbacks of the prior art or, at least, substantially reduces them.

More particularly, the invention provides a process for the preparation of nitric acid having a concentration of at least 98 wt.% from nitrogen peroxide obtained by catalytic oxidation of ammonia, separation of nitrogen oxide from the resulting gaseous flow and transformation of said nitrogen oxide into nitrogen peroxide, wherein said peroxide is chemically absorbed in diluted nitric acid to produce superazeotropic acid and wherein said superazeotropic acid is distilled, characterized in that:

a. a gaseous flow containing said nitrogen peroxide, free- or substantially free from water and nitrogen oxide, is brought into contact with nitric acid having a concentration of from 80 to 98 wt.%, thus to form a solution of said peroxide in said acid;

b. nitric acid having a concentration of from 68 to 75 wt.% is brought into contact in a first stage of chemicam absorption, with the gaseous products containing nitrogen peroxide and oxygen coming from a second stage of chemical absorption, thus to produce nitric acid having a concentration of from 70 to 80 wt.%, according to the equations

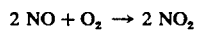

c. the liquid products discharged from said stage (b) are brought into contact in said second stage of chemical absorption with air and liquid peroxide, thus to produce superazeotropic nitric acid having a concentration of up to 90 wt.%, according to the equation:

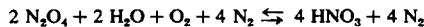

d. said solution of peroxide in nitric acid discharged from (a) and the liquid products discharged from (c) are delivered at intermediate level of a distillation column; gaseous peroxide is recovered at the top of said column, liquefied and recycled in part as reflux to the column, the remaining part being delivered to said second stage of (c); nitric acid having a concentration of at least 98 wt.% is recovered at an intermediate level of the column, but above the feeding level of said solution of (a) and liquid products of (c); a first flow of nitric acid having a concentration of from 80 to 98 wt.% and a second flow of nitric acid having a concentration of from 68 to 80 wt.% are discharged from the column and delivered to stage (a) and to stage (b), respectively.

According to a preferred embodiment of the process of the present invention, the flow of nitric acid which is recycled to the physical absorption stage (a) has a concentration of about 85% by weight and is withdrawn from the distillation column in a point comprised between the bottom and the reboiler, while the nitric acid flow which is recycled to the chemical absorption stage (b) has a concentration of about 75% by weight and is withdrawn from the reboiler of the distillation column.

In this manner the corrosion phnomena are substantially reduced.

According to another preferred embodiment the gaseous flow issuing from the first chemical absorption stage (b) is also submitted to scrubbing in the stage (a) by means of the said nitric acid having a concentration of from 80 to 98% by weight in such a way as to recover the nitrogen oxides present in said gaseous flow.

Preferably, the air fed to the second chemical absorption stage (c) is previously brought into contact with the lateral flow of nitric acid withdrawn from the distillation column in stage (d).

Nitrogen peroxide can be obtained by producing first of all nitrogen oxide from ammonia and air on platinum-rhodium catalysts in the known way, operating at 800°–950° C and at atmospheric- or above atmospheric pressure. Preferably the gaseous flow conveyed to the oxidation contains ammonia in amounts ranging from 8 to 12% molar and in the oxidation, pressures ranging from 5 to 10 absolute atmospheres are maintained. The resulting gaseous flow, containing nitrogen oxide and water vapor is then conveyed in a series of equipments for thermal recoveries and then is submitted to treatments for condensing the water contained therein and for transforming the nitrogen oxide into the corresponding peroxide.

For this purpose any of the known methods can be followed. Thus for example, the gaseous flow may be cooled until the water condenses and separates as aqueous nitric acid having a concentration in the order of 40% by weight.

Besides the nitrogen oxide can be transformed into the corresponding peroxide by means of the excess oxygen contained in the gaseous flow, even if it is possible to add a further amount of oxygen or of has containing molecular oxygen to said flow.

In any event at the end of the treatment described, gases rich in peroxide, generally around 15% by weight, wherein nitrogen oxide and water are present in negligible amounts are obtained and treated according to the process of the present invention.

A preferred embodiment of the process of the invention will be now described with reference to the accompanying drawing.

In the following description the percentages and the ratios are intended by weight, unless otherwise specified.

Stage a.

Physical absorption of the peroxide

The gaseous flow containing peroxide and having a temperature of about 40° C is fed to the bottom of column 10, by means of pipe 24.

Nitric acid having a concentration ranging from 80 to 99% and preferably around 85% is fed at the top of the column, by means of pipe 25.

The column may be either a packed or a plate type column, and in any event is supplied with an exchanger 22 for the temperature control.

The physical absorption of the peroxide in the acid takes place in column 10, operating in countercurrent and under the following preferred conditions: temperature of from 0° to 25° C, pressure of from 5 to 10 absolute atmospheres, concentration of the peroxide in the solution, discharged by means of pipe 26, of from 5 to 20%.

Operating under these conditions, a gaseous flow whose nitrogen oxides content is in the order of 1.5% is discharged at the top of column 10.

Said oxides are recovered in column 11 (either of the packed or of the plate type) by contact in countercurrent with water fed by means of pipe 28.

For this purpose the weak nitric acid obtained in a preceding section of the plant, for example in the cooling of the oxidation gases of ammonia, may also be used.

In any case the water amount, as such or in the form of weak acid, introduced into column 11, is that required by the stoichiometric balance for the subsequent reactions of chemical absorption of the peroxide.

In column 11 the operation is preferably carried out at a temperature of from 10° to 40° C and a pressure of from 5 to 10 absolute atmospheres and a gaseous flow whose nitrogen oxides content is lower than 2,000 ppm is discharged by means of pipe 29. Said gaseous flow is submitted to treatments capable of eliminating the nitrogen oxides, for instance by means of reducing substances according to the processes known in the technique and afterwards it is discharged.

Stage b.

First chemical absorption

According to the present invention the first chemical absorption of the peroxide is carried out by bringing into contact in countercurrent aqueous nitric acid, with the gaseous flow which is discharged from the second stage of the absorption.

More particularly, with reference to the accompanying drawing, nitric acid having a concentration ranging from 68 to 80% and preferably around 75%, coming from the distillation column 14 by means of pipe 32 is mixed with the dilute solution of acid coming by means of pipe 30 from the bottom of column 11.

The resulting mixture is fed by means of pipe 31, to the top of column 12 (either of the packed or of the plate type) and allowed to flow in countercurrent with the gaseous flow coming from reactor 13 and fed at the bottom of the column by means of pipe 33.

Optimal results are obtained when the absorption is carried out at a temperature of from 30° to 70° C, at a pressure of from 5 to 10 absolute atmospheres, maintaining in the liquid feed a total concentration of the acid of from 68 to 75% and in the gaseous feed a content of nitrogen oxides ranging from 30 to 50%, in the discharged liquid product a concentration of the acid of from 70 to 80% and in the discharged gaseous flow a content in nitrogen oxides of from 15 to 30%.

Therefore in column 12 is achieved a chemical absorption of the peroxide based on the following equations:

$$3 NO_2 + H_2O \rightleftarrows 2 HNO_3 + NO$$

$$2 NO + O_2 \rightarrow 2 NO_2$$

The absorption column can be appropriately supplied with a reflux condenser 23.

The gaseous flow issuing at the top of column 12 has generally a nitrogen oxides content in the order of 20% and a temperature of about 20° C and is conveniently fed at the bottom of column 10 by means of pipe 34. Thus the nitrogen oxides contained in said gaseous flow are recovered in a practically complete way.

Stage c.

Second chemical absorption

According to the present invention the liquid peroxide coming from the distillation stage by means of pipe 36 is mixed with the liquid product discharged from the first chemical absorption stage by means of pipe 35 and the resulting mixture is conveyed to reactor 13 by means of pipe 37.

In said reactor air is fed by means of pipe 38.

Reactor 13 is a normal container supplied with a stirrer.

In the second stage of chemical absorption optimal conditions are achieved by carrying out the operation at a temperature of from 30° to 70° C, at a pressure of from 5 to 10 absolute atmospheres, with a peroxide/acid ratio in the feed of from 0.15:1 to 3:1 and with an excess of air of from 50 to 200% with respect to the soichiometric amount required by the reaction.

Under these condition nitric acid having a concentration higher than the azeotropic concentration up to 90% and in general in the order of 80–90% is obtained, according to the reaction:

$$2 N_2O_4 + 2 H_2O + O_2 + 4 N_2 \rightleftarrows 2 HNO_3 + 4 N_2$$

The gaseous flow issuing from reactor 13 is conveyed to the bottom of column 12 by means of pipe 33.

The liquid products of the reaction are discharged by means of pipe 39.

Stage d.

Distillation and recycles

According to the present invention the liquid products coming from the physical absorption of the peroxide in column 10 (stage a) are submitted to distillation together with those coming from the chemical absorption of stage (c).

More particularly said mixture, consisting of nitric acid having a concentration of from 80 to 90% and having a peroxide content of from 15 to 35%, is conveyed, by means of pipe 27 and after a heat exchange in 17, to an intermediate point between the top and the bottom of distillation column 14.

Said column contains from 10 to 20 theoretical plates and the mixture is fed in at a point comprised between the 8th and the 16th plate counting from the top.

In the distillation the optimal values of the pressure are comprised in the interval ranging from 1.5 to 3 absolute atmospheres and those of the temperature vary from about 30° C at the top to 130° C at the bottom.

A lateral liquid flow (98% or more nitric acid) is withdrawn by means of pipe 42 from the column, preferably at 2 to 5 plates counting from the top.

The acid is first cooled in exchanger 20 down to about 60° C and then it is brought into contact, in column 15, with air fed by means of pipe 43.

After this bleaching treatment, 98% or more nitric acid is recovered by means of pipe 44, while air is fed to reactor 13 by means of pipe 38.

The gaseous peroxide which is discharged at the top of column 14, by means of pipe 40, is condensed in exchanger 21 and the liquid is in part recycled as reflux to the top of the column by means of pipe 41, the remaining part being fed to the chemical absorption in 13 by means of pipe 36. In the distillation it is appropriate to maintain a reflux ratio in the order of 1.5.

According to the present invention two more flows of nitric acid are withdrawn from column 14, the first of which, having a concentration of from 80 to 99%, is recycled to the physical absorption of the peroxide in column 10.

Obviously the withdrawing point is chosen on the basis of the desired concentration for the nitric acid.

In the drawing is shown a preferred embodiment, according whereto an acid having a concentration in the order of 85%, discharging by means of pipe 45, is partially fed to column 10 by means of pipe 25, after cooling in the exchanger 17 and in 16, the remaining part being conveyed to reboiler 19.

According to the present invention the bottom product of column 14 consists of nitric acid having a concentration of from 60 to 80%. In the drawing is shown a preferred embodiment wherein nitric acid having a concentration of about 75% is withdrawn from reboiler 19 of column 14 and conveyed to column 12 by means of pipe 32, after cooling in exchanger 18.

The process of the present invention, first of all, presents the advantage related to flexibility, in that it is possible to continue the nitric acid production, having the peroxide in stockage, even with the upstream plant stopped.

In fact, the production cycle of the peroxide is separated from that for the nitric acid production.

Besides, it is possible to utilize a compact equipment, because:

the flash drum for the desorption of the peroxide is eliminated inasmuch as such desorption occurs in the final distillation column;

the separation of the peroxide, the concentrated nitric acid (98% or more) and nitric acid having a lower concentration is achieved in a single distillation column instead of in the two columns of the known technique;

the condensation of the peroxide coming from the physical absorption is achieved in a single equipment;

reflux condenser 23 avoids the necessity of an accumulator for the condensate and of a pump, which would instead be required by a normal surface equipment.

Other advantages of the process of the present invention lie in the simplicity and ease of control and that, above all, because of the reduction of the equipments required.

Finally there are the advantages related to the construction materials of the equipments, because on account of the limits of the operational conditions, those expensive expedients of the prior art, such as, for instance, the construction of equipments with sections made of different materials, are not required.

In the following Example the parts and the percentages are intended by weight, unless otherwise specified.

EXAMPLE

With reference to the accompanying drawing, a gaseous flow having the following composition: $N_2$ 79.2%, $O_2$ 1.7%, $NO_2+N_2O_4$ 18.1%, NO 0.2%, $H_2O$ 0.6%, $HNO_3$ 0.2%, is fed at a rate of 8,658 kg/hr by means of pipe 24 to column 10.

A gaseous flow having the following composition: $N_2$ 68.10%, $O_2$ 7.20%, $NO_2+N_2O_4$ 24.50%, $H_2O$ 0.05%, $HNO_3$ 0.15%, is fed by means of pipe 34 to column 10 at a rate of 1,931 kg/hr.

A flow having the composition: $N_2O_4$ 0.1%, $H_2O$ 14.9%, $HNO_3$ 85.0%, is fed by means of pipe 25 at the top of column 10 at a rate of 17,982 kg/hr.

Column 10 is a packed column with an intermediate cooling.

Besides the operation is carried out in countercurrent at the pressure of 7.5 absolute atmospheres, at an average temperature of 5° C and a flow having the following composition: $N_2O_4$ 9.7%, $H_2O$ 13.6%, $HNO_3$ 76.7%, is discharged from the bottom by means of pipe 26, at a rate of 19,980 kg/hr.

This flow, pre-heated in exchanger 17, is fed to column 14 whereof more will be said in the following.

A gaseous flow having a flow rate equal to 8,591 kg/hr and the following composition: $H_2$ 95.5%, $O_2$ 3.0%, $NO_{22}+N_2O_4$ 1.0%, $H_2O+HNO_3$ 0.5%, is is discharged at the top of column 10.

This flow is scrubbed in column 11, by means of water introduced at a rate of 310 kg/hr through pipe 28.

Column 11 has a diameter of 1.5 m and contains 8 riddled plates.

A gaseous flow having the following composition: $N_2$ 95.50%, $O_2$ 3.00%, $NO_2+N_2O_4$ 0.1%, NO 0.09%, $H_2O+HNO_3$ 1.31%, which is conveyed to the final abatement of the nitrogen oxides, is discharged at the top of column 11, at a rate of 8,651 kg/hr.

A liquid (flow 30) having the following composition: $HNO_3$ 27.5%, $H_2O$ 72.5%, which is conveyed to column 12, is withdrawn at the bottom of column 11 at a rate of 340 kg/hr.

The peroxide discharged at the top of equipment 14 by means of pipe 40, is condensed in 21 and in part conveyed, by means of pipe 36 to reactor 13 and in part is refluxed to column 14 by means of pipe 41.

A liquid (flow 31) having a flow rate of 3,530 kg/hr and the composition: $HNO_3$ 70.8%, $H_2O$ 29.2%, is instead fed to column 12.

Flow 33 having the composition: $N_2$ 41.50%, $O_2$ 8.50%, $NO_2+N_2O_4$ 45.40%, $H_2O$ 1.70%, $HNO_3$ 2.90% is fed to the bottom of column 12 at a rate of 3.163 kg/hr.

Flow 34 which is conveyed to the bottom of column 10, is discharged at the top of column 12 after cooling down to 20° C in reflux condenser 23.

A liquid flow having the composition: $NO_2+N_2O_4$ 6.7%, $HNO_3$ 74.8%, $H_2O$ 18.5%, is discharged at the bottom of column 12 by means of pipe 35 at a rate of 4,762 kg/hr. This flow is combined with flow 36 and the resulting mixture having the following composition: $NO_2+N_2O_4$ 47.8%, $H_2O$ 10.4%, $HNO_3$ 41.8%, is fed to reactor 13 through pipe 37 at the rate of 8,541 kg/hr.

Reactor 13 is a 5 cu.m container, appropriately stirred, whereto is fed (line 38) at a rate of 1,755 kg/hr, a gaseous flow coming from bleaching tower 25 and having the composition: $N_2$ 74.9%, $O_2$ 22.7%, $H_2O+HNO_3$ 1.4%, $NO_{22}+N_2O_4$ 1.0%. Reactor 13 is maintained at 8 absolute atmospheres and at a temperature of 60° C.

In addition to the gaseous flow 33, a liquid effluent (pipe 39) having the composition: $N_2O_4$ 24.8%, $HNO_3$ 63.9%, $H_2O$ 11.3%, is discharged from the reactor at a rate of 7.133 kg/hr, and said liquid, joined to flow 26, is fed to column 14, by means of pipe 27, after exchange in 17.

Column 14 consists of two sections:
a riddled plates upper section
a packed lower section.

Column 14 is fed between the two sections and the pressure at the top is maintained at 2.4 absolute atmospheres, for a temperature of 40° C.

A flow of practically pure peroxide, equal to 6,443 kg/hr whereof 4,662 kg/hr are refluxed to the first plate, is obtained at the top of column 14.

A liquid flow equal to 2,162 kg/hr (pipe 42), having the composition: $NO_2+N_2O_4$ 1.2%, $HNO_3$ 98.1%, $H_2O$ 0.7%, is withdrawn at the 19.th plate, and said liquid, previously cooled in exchanger 20, is fed to bleaching tower 15, at the bottom whereof is collected the specified acid produced.

Flow 25, which is fed to column 10 after heat exchange in 17 and 16, is withdrawn from the bottom product of column 14, before feeding the latter to reboiler 19.

This expedient allows the use of a single type of material only for the construction of column 14, inasmuch as the operation is carried out in such a way that the concentration of acid within the equipment never drops below 85%.

After reboiler 19, the temperature is of 130° C and a liquid flow equal to 3,190 kg/hr, having the composition: $HNO_3$ 75.45%, $H_2O$ 24.55%, is withdrawn. Said liquid flow is conveyed to column 12, by means of pipe 32, after heat exchange in 18.

We claim:

1. A method for the preparation of nitric acid having a concentration of at least 98 wt.% from nitrogen peroxide obtained by catalytic oxidation of ammonia, separation of nitrogen oxide from the resulting gaseous flow and transformation of said nitrogen oxide into nitrogen peroxide, wherein said peroxide is chemically absorbed in diluted nitric acid to produce superazeotropic acid and wherein said superazeotropic acid is distilled, which comprises:
   a. bringing into contact a gaseous flow containing said nitrogen peroxide, free or substantially free from water and nitrogen oxide, with nitric acid having a concentration of from 80 to 98 wt.% thus to form a solution of said peroxide in said acid;
   b. bringing into contact nitric acid having a concentration of from 68 to 75 wt.% in a first stage of chemical absorption, with the gaseous products containing nitrogen peroxide and oxygen coming from a second stage of chemical absorption, thus to produce nitric acid having an increased concentration of from 70 to 80 wt.%, according to the equations

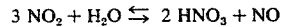

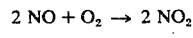

c. bringing into contact the liquid products discharged from said stage (b) in said second stage of chemical absorption with air and liquid peroxide, thus to produce superazeotropic nitric acid having a concentration of up to 90 wt.%, according to the equation:

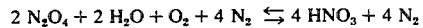

d. delivering said solution of peroxide in nitric acid discharged from (a) and the liquid products discharged from (c) at intermediate level of a distillation column; recovering gaseous peroxide at the top of said column, liquefying the latter and recycling a part of said liquefied peroxide as reflux to the column, the remaining part being delivered to said second stage of (c); extracting nitric acid having a concentration of at least 98 wt.% at an intermediate level of the column, but above the feeding level of said solution of (a) and liquid products of (c); extracting a first flow of nitric acid having a concentration of from 80 to 98 wt.% and a second flow of nitric acid having a concentration of from 68 to 80 wt.% from the column and delivering the latter to stage (a) and to stage (b), respectively.

2. The method of claim 1, wherein water and/or weak nitric acid, the latter being obtained by scrubbing with water the peroxide not absorbed in stage (a), are admixed with said second flow deschaged from stage (d) and the whole is delivered to stage (b).

3. The method of claim 1, wherein said first flow discharged from (d) has a concentration of about 85 wt.% and is extracted at a point between the bottom and the reboiler of said distillation column, while said second flow discharged from (d) has a concentration of about 75 wt.% and is extracted from said reboiler.

4. The method of claim 1, wherein the gaseous flow issuing from stage (b) and containing unreacted nitrogen peroxide is also brought into contact with said nitric acid in stage (a), thereby to absorb said unreacted peroxide in said solution of (a).

5. The method of claim 1, wherein said air to be used in stage (c) is previously brought into contact with said lateral flow of nitric acid extracted from stage (d).

6. The method of claim 1, wherein said stage (a) is operated at a pressure of from 5 to 10 atmospheres and at a temperature of from 0 to 25° C, said solution discharged from stage (a) containing from 5 to 20 wt.% of peroxide.

7. The method of claim 1, wherein said stage (b) is operated at a temperature of from 30° to 70° C and at a pressure of from 5 to 10 atmospheres.

8. The method of claim 1, wherein said stage (c) is operated at a temperature of from 30° to 70° C and at a pressure of from 5 to 10 atmospheres, with a peroxide/nitric acid weight ratio in the feed of from 0.15:1 to 3:1 and with an excess of air of from 50 to 200% with respect to the stoichiometric amount required by the reaction, said liquid products discharged from (c) containing nitric acid having a concentration of from 80 to 80 wt.% and from 15 to 35 wt.% of nitrogen peroxide.

9. The method of claim 1, wherein said distillation column of (d) comprises from 10 to 20 theoretical plates and is operated at a pressure of from 1.5 to 3 atmospheres, at a top temperature of about 30° C and at a bottom temperature of 130° C, said solution of (a) and said liquid products of (c) being delivered at a point between the 8.th and the 16.th plate from the top and said lateral flow being extracted at a point from the 2.nd and the 5.th plate from the top.

UNITED STATES PATENT AND TRADEMARK OFFICE
CERTIFICATE OF CORRECTION

PATENT NO. : 4,018,872
DATED : April 19, 1977
INVENTOR(S) : Diego Barba et al.

It is certified that error appears in the above-identified patent and that said Letters Patent are hereby corrected as shown below:

Column 1, line 28, "hyghly" should be --highly--;
Column 2, line 6, "peroxxide" should be --peroxide--;
Column 2, line 30, "an then" should be --and then--;
Column 3, lines 20-21, "chemicam" should be --chemical--;
Column 3, line 64, "phnomena" should be --phenomena--;
Column 4, line 31, "has" should read --gas--;
Column 6, line 12, "soichiometric" should be --stoichiometric--;
Column 7, line 3, "discharging" should read --discharged--
Column 8, line 7, "$NO_{22}$" should read --$NO_2$--;
Column 8, line 7, "is is" should read --is--;
Column 8, line 46, "tower 25" should read --tower 15--;
Column 8, line 48, "$NO_{22}$" should read --$NO_2$--;
Column 8, line 54, "7.133" should read --7,133--;
Column 10, line 16, "descharged" should be --discharged--;
Column 10, line 48, "80 wt.%" should read --90 wt.%--.

Signed and Sealed this nineteenth Day of July 1977

[SEAL]

Attest:

RUTH C. MASON
Attesting Officer

C. MARSHALL DANN
Commissioner of Patents and Trademarks